United States Patent [19]

Engelskirchen et al.

[11] Patent Number: 5,541,316
[45] Date of Patent: Jul. 30, 1996

[54] PROCESS FOR THE PRODUCTION OF POLYSACCHARIDE-BASED POLYCARBOXYLATES

[75] Inventors: Konrad Engelskirchen, Meerbusch; Herbert Fischer, Duesseldorf; Hans-Wilhelm Verholt, Langenfeld, all of Germany

[73] Assignee: Henkel Kommanditgesellschaft auf Aktien, Duesseldorf, Germany

[21] Appl. No.: 256,882

[22] PCT Filed: Feb. 3, 1993

[86] PCT No.: PCT/EP93/00244

§ 371 Date: Jul. 28, 1994

§ 102(e) Date: Jul. 28, 1994

[87] PCT Pub. No.: WO93/16110

PCT Pub. Date: Aug. 19, 1993

[30] Foreign Application Priority Data

Feb. 11, 1992 [DE] Germany .......................... 42 03 923.1

[51] Int. Cl.$^6$ .......................... C07G 17/00; C08B 35/00; C11D 3/04
[52] U.S. Cl. .......................... 510/471; 536/104; 536/105; 536/120; 536/97; 536/124; 252/135; 252/174.18; 252/539; 510/534; 510/533; 510/361
[58] Field of Search .................................. 536/104, 105, 536/124, 120, 97; 252/135, 174.18, 539, DIG. 2, DIG. 11

[56] References Cited

U.S. PATENT DOCUMENTS

| | | | |
|---|---|---|---|
| 2,472,590 | 6/1949 | Kenyon et al. | 260/209 |
| 3,478,752 | 11/1969 | Briskin et al. | 131/2 |
| 3,665,000 | 5/1972 | Hills et al. | 536/105 |
| 3,740,339 | 6/1973 | MacDonald | 252/135 |
| 3,790,561 | 2/1974 | MacDonald | 260/212 |
| 4,056,400 | 11/1977 | Diamantoglou et al. | 106/162 |
| 4,090,016 | 5/1878 | Tsuji et al. | 536/120 |
| 4,333,484 | 6/1982 | Keritsis | 131/359 |
| 4,347,056 | 8/1982 | Yasnitsky et al. | 8/116 R |
| 4,439,271 | 3/1984 | Samuelson | 162/19 |
| 4,507,474 | 3/1985 | Raehse et al. | 536/97 |
| 4,531,000 | 7/1985 | Yalpani | 536/30 |
| 4,762,591 | 8/1988 | Samuelson | 162/237 |
| 5,180,398 | 1/1993 | Boardman et al. | 8/181 |
| 5,414,079 | 5/1995 | Banker et al. | 536/56 |

FOREIGN PATENT DOCUMENTS

| | | |
|---|---|---|
| 0425369 | 5/1991 | European Pat. Off. . |
| 0455522 | 11/1991 | European Pat. Off. . |
| 0941282 | 4/1956 | Germany . |
| 0967144 | 10/1957 | Germany . |
| 2412837 | 3/1978 | Germany . |
| 0069883 | 3/1952 | Netherlands . |
| 0078087 | 3/1955 | Netherlands . |
| 8002500 | 2/1970 | Netherlands . |

OTHER PUBLICATIONS

Houben–Weyl "Methoden der organischen Chemie", Thieme–Verlag, Stuttgart (1987), vol. E20, Makromolekulare Stoffe, subchapter entitled "polysaccharid–Derivate" edited by Dr. K. Engelskirchen, loc. cit. pp. 2042 et seq., more particularly pp. 2124 et seq. (oxidation products of cellulose) and pp. 2166 et seq. (oxidized starches).

"Cellulose Chemistry and its Applications" (1983), John Wiley & Sons, Chichester, GB, more particularly chapter 10 Oxidation of Cellulose.

*Primary Examiner*—John Kight, III
*Assistant Examiner*—Louise N. Leary
*Attorney, Agent, or Firm*—Wayne C. Jaeschke; John Daniel Wood; Daniel W. Ortiz

[57] ABSTRACT

A process for the production of polycarboxylic acids or salts thereof from polysaccharides by oxidation with nitrogen dioxide/dinitrogen tetroxide with at least partial conversion of the primary alcohol groups of the polysaccharides into carboxyl groups and optionally at least partial neutralization of the carboxylic acid groups formed is provided. The oxidation reaction is carried out in a closed reaction system in the presence of oxygen under pressures of 2 bar to 10 bar and at a temperature above room temperature. Nitrogen dioxide/dinitrogen tetroxide is used in such quantities that, in the event of a theoretically complete shift of the equilibrium onto the nitrogen dioxide side, the nitrogen dioxide is present in quantities of at most 2 mole equivalents, based on the content of monomer unit of the polysaccharide containing one primary alcohol group.

39 Claims, No Drawings

PROCESS FOR THE PRODUCTION OF POLYSACCHARIDE-BASED POLYCARBOXYLATES

BACKGROUND OF THE INVENTION

1. Field of the Invention

This invention relates to a process for the production of polycarboxylates by selective oxidation of polysaccharides with nitrogen dioxide and to the use of the polycarboxylates obtained by this process as builders or co-builders in detergents or cleaning preparations.

2. Discussion of Related Art

Extensive knowledge exists on the production of polycarboxylates by oxidative treatment of polysaccharides, for example cellulose, starch and dextrins, cf. for example Houben-Weyl "Methoden der organischen Chemie", Thieme-Verlag, Stuttgart (1987), Vol. E 20, Makromolekulare Stoffe, subchapter entitled "Polysaccharid-Derivate" edited by Dr. K. Engelskirchen, loc. cit., pages 2042 et seq., more particularly pages 2124 et seq. (oxidation products of cellulose) and pages 2166 et seq. (oxidized starches), and the publication entitled "Cellulose Chemistry and its Applications,, (1983), John Wiley & Sons, Chichester, GB, more particularly chapter 10 "Oxidation of Cellulose" by T. P. Nevell and the extensive literature cited therein, loc. cit., pages 262 to 265.

Roughly summarized, it may be said that several oxidizing agents are commonly used for the oxidation of polysaccharides, more particularly polyglucosans produced exclusively from glucose. They include, for example, (atmospheric) oxygen, hydrogen peroxide, sodium chlorite or bromite, periodic acid and periodates, lead(IV) acetate, nitrogen dioxide and cerium(IV) salts. These oxidizing agents react very differently with the anhydroglucose units, cf. for example the formula schemes in Houben-Weyl, loc. cit., page 2124. For example, periodates or lead(IV) acetate promote C—C cleavage of the anhydroglucose rings; so-called 2,3-dialdehyde cellulose is obtained from cellulose and dialdehyde starch is similarly obtained from starch. It is also known that, when cellulose is exposed to the action of nitrogen dioxide, oxidation of the primary alcohol group to the carboxyl group is by far the predominant reaction. The oxidizing agent, generally present in equilibrium with dinitrogen tetroxide, may be used in gaseous form or in solution in an inert organic solvent, cf. Houben-Weyl loc. cit., page 2125 and the primary literature cited in this connection therein. It is even possible starting out from starch to achieve substantially selective oxidations of the primary alcohol group of the anhydroglucose units to the carboxyl group. Thus, the oxidation of starch with gaseous nitrogen dioxide or nitrogen dioxide dissolved in water or in various organic solvents at room temperature/normal pressure is known from U.S. Pat. No. 2,472,590.

Under these conditions, the substantially complete conversion of the primary alcohol groups of the polysaccharides into carboxyl groups is only achieved after very long reaction times which can amount to several days. In addition, large amounts of nitrogen dioxide, based on the polysaccharide to be oxidized, are required in the known process.

The problem addressed by the present invention was to enable the production of such oxidation products of polysaccharides to be improved to secure their availability because the polycarboxylates formed are of interest as potential ingredients, more particularly as builders or co-builders, of detergents and cleaning preparations. The same also applies to the salts of such polycarboxylates, more particularly their water-soluble salts, because the use of oxidized polysaccharide compounds to boost the performance of detergents and/or cleaning preparations has basically been known and repeatedly investigated for decades, cf. for example Dutch patent applications NL 69 883 and NL 78 087. The replacement of phosphate-based builder systems by 6-carboxycellulose treated with Lewis acids is described in U.S. Pat. Nos. 3,740,339 and 3,790,561. Dutch patent application NL 70/02 500 also seeks to use oxidized polysaccharide derivatives as builder systems for increasing detergent performance, particularly in laundry detergents. However, this document is not concerned with derivatives selectively oxidized at the $C_6$ atom, but instead with oxidation products formed by substantial cleavage of the anhydroglucose units between $C_2$ and $C_3$. Finally, European patent application EP 425 369 describes surfactant-containing laundry detergent mixtures containing a builder system of conventional phosphate compound, zeolite and oxidation products of cellulose, starch or glucose sirup. There are no reproducible disclosures relating to the preparation of the oxidized saccharide compounds described therein. In addition, stabilization of the polysaccharide oxidates initially formed by catalytic hydrogenation is described as desirable.

The teaching according to the invention is based on the surprising observation that polycarboxylates can be inexpensively obtained in high yields from polysaccharides by a simple process in which the oxidation reaction is carried out with nitrogen dioxide/dinitrogen tetroxide in the presence of oxygen at elevated temperatures. The expression "nitrogen dioxide/dinitrogen tetroxide" stands for the equilibrium mixture of nitrogen dioxide and its dimer, dinitrogen tetroxide, present under the particular reaction conditions.

SUMMARY OF THE INVENTION

Accordingly, the present invention relates to a process for the production of polycarboxylic acids or salts thereof from polysaccharides by oxidation with nitrogen dioxide/dinitrogen tetroxide with at least partial conversion of the primary alcohol groups of the polysaccharides into carboxyl groups and optionally at least partial neutralization of the carboxylic acid groups formed, characterized in that the oxidation reaction is carried out at a temperature above room temperature in the presence of oxygen. The upper temperature limit is a temperature of 150° C. because decomposition was increasingly observed at higher temperatures.

DETAILED DESCRIPTION OF THE INVENTION

Accordingly, the oxidation reaction is preferably carried out at temperatures of 30° C. to 70° C. and more particularly at temperatures of 40° C. to 60° C. Particularly good results are obtained where the oxidation reaction is carried out in a closed reaction system under pressures of 1 bar to 10 bar and, more particularly, 2 bar to 6 bar, as measured at the reaction temperature. According to the invention, these pressures in the reaction vessel are established by introduction of gaseous oxygen under pressure either on its own or in admixture with a gas which is inert under the reaction conditions. The oxidation reaction of the process according to the invention is preferably carried out in such a way that the oxygen partial pressure in the reaction system is in the range from 0.1 bar to 9 bar and more particularly in the range from 0.5 bar to 6 bar. The oxygen may be introduced once only at the beginning of the reaction or repeatedly, if desired continuously, during the reaction. In the latter case, it is a particular advantage that the oxidation reaction can be controlled as a function of temperature or pressure through the introduction of oxygen. The introduction of oxygen is preferably controlled in such a way that the reaction temperature remains in the above-mentioned range of 30° C. to 70° C.

Noble gases, such as helium or argon, and carbon dioxide, but especially nitrogen, and mixtures of such gases may be used as the inert gases, i.e. gases which do not react under the particular process conditions required. The oxygen content of the gas mixture is preferably from 1% by volume to 30% by volume and more preferably from 3% by volume to 10% by volume. In one preferred embodiment of the process according to the invention, oxygen is introduced under pressure in the form of air.

Another preferred embodiment of the process is characterized in that, before the beginning of the oxidation reaction, a pressure of less than 10 bar and, more particularly, in the range from 2 bar to 6 bar at the required reaction temperature is established in the reaction system by introduction of one of the above-mentioned inert gases under pressure and by the subsequent introduction under pressure of oxygen or a mixture of oxygen with one of the above-mentioned inert gases repeatedly and, if desired, continuously. The nitrogen dioxide/dinitrogen tetroxide may be added before or after addition of the oxygen or before or after the beginning of addition of the oxygen. It may be necessary in this regard to heat the reaction vessel to the required reaction temperature after the initial introduction of the inert gas under pressure. During the oxidation reaction, which is best accompanied by intensive mixing of the reactants, the reaction temperature may generally be maintained without external heating, i.e. solely through the quantity of oxygen added.

In one embodiment of the invention, oxidation of the polysaccharide may take place by the suspension process in which it is used in the form of a suspension in a liquid substantially inert under the reaction conditions.

Where oxidation is carried out by the suspension process, organic liquids which, on the one hand, effectively dissolve nitrogen dioxide/dinitrogen tetroxide and oxygen and which, on the other hand, are largely inert to them under the reaction conditions are suitable for use as the suspension medium for the polysaccharide. Suitable suspension media are hydrocarbons, above all halogenated hydrocarbons, more particularly carbon tetrachloride. The quantity of suspension medium used may be varied over a wide range without significantly affecting the oxidation result. In general, the ratio by weight of suspension medium to polysaccharide is in the range from 3:1 to 8:1. On completion of the oxidation reaction, the suspension medium is separated from the oxidized polysaccharide by simple filtration or centrifugation, optionally after removal of the excess pressure in the reaction system. It may be reused in the oxidation reaction either directly or if desired after working up. The oxidation product is optionally washed with an organic solvent and/or water or mixtures thereof and dried. The drying step after washing with water may be omitted if the polycarboxylate obtained is to be subsequently processed to water-containing liquid or paste-form products.

In another embodiment of the invention, however, the polysaccharides may also be derivatized in the absence of a suspension medium or solvent, i.e. by the so-called dry oxidation process. In this process, the oxidizing agent (nitrogen dioxide and oxygen) acts directly from the gas phase on the solid, intensively mixed substrates.

The substrates may be mixed inter alia in a moving bed with a throughflowing gas containing the oxidizing agents or in a fluidized bed using intensive mixers, for example L ödige Druvatherm® mixers.

Above all in the case of starch, which, in its native state, often has a tendency towards agglomeration and towards the phenomenon of "channeling" so troublesome in fluidized bed technology, flow behavior can be significantly improved by the addition of small quantities of, in particular, solid additives including, for example, magnesium oxide, calcium fluoride, calcium phosphate or pyrogenic silicon dioxide, more particularly the silicon dioxide marketed under the name of Aerosil®. Significant effects are achieved in this regard with only small additions of, preferably, 0.1% by weight to 5% by weight and, more particularly, 0.25% by weight to 1% by weight, based on the polysaccharide to be oxidized. Starches thus treated show almost liquid-like behavior so far as their mixability is concerned.

In the dry oxidation process, the reaction mixture may be directly taken up in water after the actual oxidation reaction and then purified and isolated by washing with water and filtration. A considerable proportion of the nitrogen oxides present in the reaction system on completion of the reaction can also be removed by simple degassing processes. Thus, a simple vacuum treatment of the reaction mixture with no water-based working up generally leads to products with acceptably low nitrite and nitrate contents.

The nature of the polysaccharide used has no real bearing on the process according to the invention. The only requirement is that it should contain carbohydrate units bearing primary alcohol groups. Suitable polysaccharides are any native polyglucosans, more particularly starch and/or cellulose, and also other polysaccharides, for example polygalactomannans, such as guaran and carubin. The polysaccharides may also be used in chemically or physically modified form providing they still contain oxidizable primary alcohol groups. On economic grounds, it is preferred to use starches of varying provenance, more particularly potato starch, wheat starch, cornstarch or tapioca starch. The polysaccharide used preferably contains no more than 20% by weight and, more preferably, from 4% by weight to 10% by weight of water.

Nitrogen dioxide/dinitrogen tetroxide is preferably used in the process according to the invention in such quantities that, if the equilibrium is in theory completely shifted onto the nitrogen dioxide side, the nitrogen dioxide is present in quantities of at most 2 mole equivalents and, more particularly, 0.1 to 1 mole equivalent, based on the content of monomer units of the polysaccharide containing one primary alcohol group.

The oxidation reaction of the process according to the invention is carried out using the above-mentioned polyglucosans preferably over a such a period that, on a statistical average, at least 15 mole-% of the oxidation product consists of oxidized anhydroglucose units corresponding to formula I:

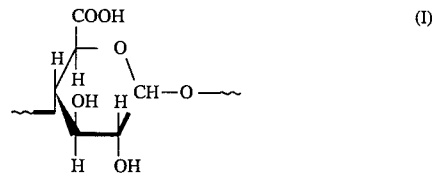

which corresponds to a carboxyl group content of at least 4% by weight.

This process gives polyglucosan-based polycarboxylates which preferably contain at least 25 mole-% and, more preferably, at least 35 mole-% to 40 mole-% of the oxidized anhydroglucose units corresponding to formula I in the molecule, another advantage being that no significant quantities of other secondary oxidation products are present.

In the suspension process, for example, using starch in the form of a suspension in carbon tetrachloride, highly oxidized products, i.e. those with a content of units corresponding to formula I of up to about 95 mole-%, more particularly up to 100 mole-% and preferably in the range from about 70 mole-% to 100 mole-%, corresponding to a carboxyl group content of up to about 25% by weight, are obtained over a period of about 4 hours to 6 hours at 2 bar to 6 bar/50° C. using approximately 0.5 mole equivalent of nitrogen dioxide.

After the oxidation reaction and the optional working-up treatment, it is possible as described to subject the carboxyl groups of the oxidation product to at least partial neutralization by treatment with a basic reagent, i.e. to convert them from the acid form into the salt form. An aqueous solution containing alkali metal hydroxide, ammonium hydroxide and/or organic base is preferably used as the neutralizing agent. Neutralization may also be carried out immediately after the oxidation reaction, for example by introducing gaseous ammonia into the reaction vessel. Salt formation may also be carried out under reducing conditions, for example using sodium borohydride. The neutralizing agent is preferably used in such quantities that all the carboxyl groups of the oxidation product are converted into the salt form. The oxidation product may be added to the neutralizing agent or the neutralizing agent may be added to the oxidation product. Salt formation may also take place under the conditions under which the polycarboxylates are used or subsequently processed in their acid form, for example in the production or use of detergents or cleaning preparations by typical alkaline components of such products.

The polycarboxylates produced by the process according to the invention are preferably used as builders or co-builders in detergents or cleaning preparations. In products such as these, they are preferably used as co-builders in quantities of 0.5% by weight to 10% by weight and more particularly in quantities of 2% by weight to 7% by weight, based on the total weight of the product containing zeolite as the main builder. In a particularly preferred embodiment they are used in detergents or cleaning preparations containing zeolite NaA, for example of the type described in connection with laundry detergents in German patent DE 24 12 837, as the main builder and polycarboxylic acids produced in accordance with the invention or salts thereof in quantity ratios of 2:1 to 5:1. The composition of the detergents and/or cleaning preparations may otherwise be selected virtually as required within the limits of known formulations.

EXAMPLES

Example 1

275.2 g of potato starch (1.6 moles per anhydroglucose unit) with a moisture content of approximately 6% by weight were suspended in 825 g of carbon tetrachloride and the resulting suspension was transferred to a 2 liter stirred autoclave. After evacuation of the autoclave and purging with nitrogen, 36.8 g of condensed dinitrogen tetroxide (0.4 mole) were added. The reaction mixture was heated to 50° C. over a period of 30 minutes. The internal pressure in the autoclave was 0.5 bar (adjusted with nitrogen). A pressure of 6 bar was established by the introduction of oxygen under pressure. The introduction of oxygen under pressure was repeated when the pressure in the autoclave had fallen to 2 bar. After 6 hours, the autoclave was cooled to room temperature and vented and 1 liter of demineralized water was added to the reaction mixture. The suspension of the oxidation product was filtered through a glass filter nutsch. The product was washed first with acetone and then with water until the washing liquid showed a neutral reaction, freed from water with acetone and dried (70° C., vacuum drying cabinet). White powder-form polycarboxylate with an acid value of 245, corresponding to an average content of around 0.75 carboxyl groups per anhydroglucose unit, was obtained in a yield of 257 g.

The acid value of the product obtained in this Example and all other polysaccharide oxidates was determined as follows:

Approximately 0.5 g to 0.75 g of oxidate are suspended in 50 ml of demineralized water. 10 ml of 0.5N alcoholic potassium hydroxide solution are added to the resulting suspension which is then stirred for 30 minutes at room temperature. Products with acid values above about 60 pass into solution. Excess potassium hydroxide is back-titrated with 0.5N aqueous hydrochloric acid against phenolphthalein as indicator.

The acid value is expressed in milligrams of KOH per gram of polysaccharide oxidate.

Example 2

Example 1 was repeated using 73.6 g (0.8 mole) of condensed dinitrogen tetroxide, oxygen being introduced into the autoclave under pressure so that an internal pressure of 2 bar was maintained for the first hour of the reaction and was subsequently increased to 6 bar over the next hour. After a reaction time of 4.5 hours, there was no further consumption of oxygen, as reflected in the fall in pressure. The reaction product (yield 256 g) worked up as in Example 1 had an acid value of 324 corresponding to an average content of about 1 carboxyl group per anhydroglucose unit.

Example 3

Example 1 was repeated using 137.6 g (0.8 mole per anhydroglucose unit) of potato starch, an internal pressure of 10 bar being established with oxygen in the autoclave before the heating to 50° C. and the reaction mixture then being stirred for 6 hours at 50° C. The internal pressure fell to 1 bar over a period of 1 hour and, after oxygen had been introduced up to a pressure of 5 bar, then fell to a constant value of 3.5 bar over a period of another 2 hours. 127.5 g of oxidation product with an acid value of 343, corresponding to an average content of about 1.1 carboxyl groups per anhydroglucose unit, were obtained after working up as described above.

Examples 4–7

Quantities of 275.2 g of wheat starch, cornstarch, tapioca starch and guar flour were oxidized, isolated and worked up into polycarboxylates in the same way as described in Example 2. The yields of the products and their acid values are shown in the following Table.

| Example | Polysaccharide | Yield [g] | Acid value |
| --- | --- | --- | --- |
| 4 | Wheat starch | 254.5 | 263 |
| 5 | Cornstarch | 256.8 | 347 |

-continued

| Example | Polysaccharide | Yield [g] | Acid value |
|---------|----------------|-----------|------------|
| 6 | Tapioca starch | 255.8 | 326 |
| 7 | Guar flour | 188.5 | 261 |

The products obtained in accordance with Examples 1 to 7 were converted into their sodium or ammonium salts by addition of stoichiometric quantities of aqueous sodium hydroxide solution or aqueous ammonium hydroxide solution. The salts obtained were readily soluble in cold water.

Example 8

137.6 g of potato starch (0.8 mole per anhydroglucose unit) with a moisture content of around 6% by weight were introduced into a 2 liter stirred autoclave which was then closed and evacuated. The starch was heated with intensive mixing to a temperature of 40° C. 36.8 g of condensed dinitrogen tetroxide (0.4 mole) were evaporated in the autoclave and the temperature of the reaction mixture was increased to 50° C. The internal pressure was adjusted to 6 bar by introduction of nitrogen under pressure and was then increased to 7 bar by introduction of oxygen under pressure. The reaction mixture was kept for 4 hours at 50° C. and at a pressure of 5 bar to 7 bar which was maintained by introduction of oxygen under pressure whenever the pressure fell by 1 bar to 2 bar. Working up as described in Example 1 gave 131 g of polycarboxylate in the form of a white powder with an acid value of 340 corresponding to an average content of around 1.05 carboxyl groups per anhydroglucose unit.

Example 9

For comparison, Example 1 was repeated by establishing an internal pressure of 1 bar by introduction of nitrogen under pressure after the autoclave had been filled with dinitrogen tetroxide, heating the contents of the autoclave to 50° C. over a period of 30 minutes and stirring for 6 hours at that temperature. The internal pressure rose continuously to 4.2 bar. Isolation and working up as described above gave 268 g of an oxidation product with an acid value of 83 corresponding to an average content of around 0.25 carboxyl groups per anhydroglucose unit.

Example 10

For comparison, Example 8 was repeated by adjusting the internal pressure in the autoclave to 3 bar by introduction of nitrogen under pressure after the reaction mixture had been heated and not adding any oxygen to the reaction system during the reaction (5 hours at 50° C.). During this time, the pressure rose to 4 bar. Working up gave 128 g of polycarboxylate in the form of a white powder with an acid value of 150 corresponding to an average content of around 0.45 carboxyl groups per anhydroglucose unit.

Comparison of Examples 9 and 10 with Examples 1 to 8 shows that the addition of oxygen to the reaction mixture produces a significant increase in the carboxyl group content of the oxidized polysaccharide under acceptable reaction conditions, more particularly over a relatively short reaction time.

Example 11

10 kg of potato starch (water content 4.1% by weight) and 0.1 kg of Aerosil® were introduced into a 50 liter Druvatherm® mixer (Lödige type DVT; a reactor with a horizontally arranged centrifugal mixer equipped with plow-share-like mixer blades) and intensively mixed (rotational speed of the mixer: 50 r.p.m. which was maintained in all the subsequent process steps). After the reactor had been evacuated, 2.85 kg of nitrogen dioxide from a steel cylinder filled with dinitrogen tetroxide were evaporated into the reactor while cooling with water, the mixer being left running. At an internal temperature of 30° C., an internal pressure of 1 bar was established. The internal pressure was increased to 4 bar by introduction of nitrogen under pressure. After the reaction mixture had been heated to 50° C., 2.4 kg of oxygen were introduced under pressure into the reactor in portions over a period of 5 hours at the temperature of 50° C. in such a way that a maximum internal pressure of 6 bar was not exceeded.

After another 30 minutes, the contents of the reactor were cooled to 20° C. The reactor was then vented via a gas scrubber filled with aqueous sodium hydroxide solution.

After venting, 30 l of demineralized water were introduced into the reactor. The resulting carboxyl starch suspension was drained off and filtered. The filter cake was repeatedly washed with water, freed from water with acetone and dried in vacuo at 70° C.

A white powder with an acid value of 326 was obtained in a yield of 9.7 kg.

We claim:

1. A process for the production of polycarboxylic acids or salts thereof, comprising: oxidizing a polysaccharide with nitrogen dioxide/dinitrogen tetroxide with at least partial conversion of the primary alcohol groups of the polysaccharides into carboxyl groups and optionally at least partial neutralization of the carboxylic acid groups formed, said oxidizing being carried out in a closed reaction system in the presence of a gas comprising oxygen under a pressure of 2 bar to 10 bar and at a temperature above room temperature to form the polycarboxylic acid, wherein nitrogen dioxide/dinitrogen tetroxide is used in such a quantity that, in the event of a theoretically complete shift of the equilibrium to nitrogen dioxide, the nitrogen dioxide would be present in a quantity of at most 2 mole equivalents, based on the content of monomer units of the polysaccharide containing one primary alcohol group.

2. The process as claimed in claim 1 wherein said oxidizing temperature is from 30° C. to 70° C.

3. The process as claimed in claim 2 wherein said oxidizing temperature is from 40° C. to 60° C.

4. The process as claimed in claim 1 wherein said oxidizing is carried out under the pressure of 2 bar to 6 bar, as measured at the reaction temperature.

5. The process as claimed in claim 4 wherein the pressure in the reaction system is established by introduction of gaseous oxygen under pressure.

6. The process as claimed in claim 5 wherein the pressure in the reaction system is established by said introduction only once, at the beginning of the reaction.

7. The process as claimed in claim 5 wherein the pressure in the reaction system is established by said introduction repeatedly during the reaction.

8. The process as claimed in claim 5 wherein the pressure in the reaction system is established by said introduction continuously during the reaction.

9. The process as claimed in claim 5 wherein in said introduction of oxygen, said oxygen is in the form of a mixture with at least one gas which is inert under the reaction conditions, said oxygen making up from 1% by volume to 30% by volume of the gas mixture.

10. The process as claimed in claim 9 wherein said oxygen makes up from 3% by volume to 10% by volume of the gas mixture.

11. The process as claimed in claim 9 wherein said inert gas is a gas selected from the group consisting of helium, argon, carbon dioxide, nitrogen, and a mixture thereof.

12. The process as claimed in claim 9 wherein said inert gas is nitrogen.

13. The process as claimed in claim 9 wherein the pressure in the reaction system is established by introduction of air under pressure.

14. The process as claimed in claim 5 wherein a pressure of less than 10 bar is established in the reaction system before the beginning of the oxidation reaction by introduction under pressure of an inert gas and after the beginning of the reaction, oxygen or a mixture of 1% by volume to 30% by volume oxygen with the inert gas is repeatedly introduced under pressure so that the oxygen partial pressure in the reaction system is in the range from 0.1 bar to 10 bar.

15. The process as claimed in claim 5 wherein a pressure of from 2 bar to 6 bar is established in the reaction system before the beginning of the oxidation reaction by introduction under pressure of an inert gas selected from the group consisting of nitrogen, helium, argon, carbon dioxide or a mixture thereof, and after the beginning of the reaction oxygen or a mixture of 3% by volume to 10% by volume of oxygen with at least one of said inert gases is continuously introduced under pressure so that the oxygen partial pressure in the reaction system is in the range from 0.5 bar to 6 bar.

16. The process as claimed in claim 1 wherein said polysaccharide is in the form of a suspension in a liquid, said liquid being substantially inert under the reaction conditions.

17. The process as claimed in claim 16 wherein said liquid is a halogenated hydrocarbon.

18. The process as claimed in claim 16 wherein said liquid is carbon tetrachloride.

19. The process as claimed in claim 1 wherein said polysaccharide is oxidized in the absence of a suspension medium or solvent.

20. The process as claimed in claim 1 wherein said polysaccharide is oxidized in the presence of a flow-promoting solid additive.

21. The process as claimed in claim 20 wherein said additive is selected from the group consisting of magnesium oxide, calcium fluoride, calcium phosphate, pyrogenic silicon dioxide and mixtures thereof.

22. The process as claimed in claim 20 wherein said additive is present in an amount of 0.1% by weight to 5% by weight based on the polysaccharide to be oxidized.

23. The process as claimed in claim 22 wherein said additive is present in an amount of 0.25% by weight to 1% by weight based on the polysaccharide to be oxidized.

24. The process as claimed in claim 19 wherein said oxidizing is carried out in a moving bed or in a fluidized bed of the polysaccharide to be oxidized using a throughflowing gas containing nitrogen dioxide/dinitrogen tetroxide and oxygen.

25. The process as claimed in claim 1 wherein said polysaccharide is a polyglucosan of native origin.

26. The process as claimed in claim 1 wherein said polysaccharide comprises at least one member selected from the group consisting of starch and cellulose.

27. The process as claimed in claim 26 wherein said polysaccharide comprises a native starch selected from potato starch, wheat starch, cornstarch, tapioca starch and mixtures thereof.

28. The process as claimed in claim 1 wherein said nitrogen dioxide/dinitrogen tetroxide is used in such quantity that, in the event of a theoretically complete shift of the equilibrium to nitrogen dioxide, the nitrogen dioxide would be present in a quantity of 0.1 to 1 mole equivalent, based on the content of monomer units of the polysaccharide containing one primary alcohol group.

29. The process as claimed in claim 28 wherein said polysaccharide is a polyglucosan and said oxidizing is carried out so that, on a statistical average, at least 15 mole-% of the polycarboxylic acid comprises oxidized anhydroglucose units of the formula I:

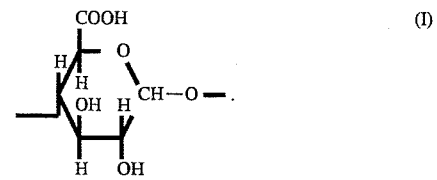

30. The process as claimed in claim 29 wherein the polycarboxylic acid contains at least 25 mole-% of oxidized anhydroglucose units of the formula I in the molecule, the oxidation product being free from significant quantities of other secondary oxidation products.

31. The process as claimed in claim 30 wherein the polycarboxylic acid contains 35 mole-% to 40 mole-% of oxidized anhydroglucose units of the formula I in the molecule.

32. The process as claimed in claim 29 wherein the polycarboxylic acid comprises at least one selectively oxidized polyglucosan, the polyglucosan being selected from the group consisting of cellulose and starch, containing up to about 95 mole-% of oxidized anhydroglucose units of the formula I in the molecule.

33. The process as claimed in claim 29 wherein the polycarboxylic acid comprises at least one selectively oxidized polyglucosan, the polyglucosan being selected from the group consisting of cellulose and starch, containing about 40 mole-% to 80 mole-% of oxidized anhydroglucose units of the formula I.

34. The process as claimed in claim 1 wherein the carboxyl groups of the polycarboxylic acid are at least partly neutralized after the oxidizing by treatment with an aqueous solution containing at least one member selected from the group consisting of alkali metal hydroxide, ammonium hydroxide and organic base, 35. In a detergent or cleaning composition, the improvement comprising: introducing the polycarboxylic acids or salts thereof produced by the process claimed in claim 1 as a builder or co-builder in said composition.

36. The detergent or cleaning composition as claimed in claim 35 wherein the quantity of said polycarboxylic acids or salts thereof is 0.5% by weight to 10% by weight based on the total weight of the composition.

37. The detergent or cleaning composition of claim 35 wherein the quantity of said polycarboxylic acids or salts thereof is 2% by weight to 7% by weight based on the total weight of the composition.

38. The detergent or cleaning composition as claimed in claim 35 wherein a zeolite is a principle builder.

39. The detergent or cleaning composition as claimed in claim 38 wherein the detergent or cleaning composition contains zeolite NaA as the principal builder in a weight ratio to said polycarboxylic acids or salts thereof of 3:1 to 4:1.

* * * * *

UNITED STATES PATENT AND TRADEMARK OFFICE
CERTIFICATE OF CORRECTION

PATENT NO. : 5,541,316
DATED : July 30, 1996
INVENTOR(S) : Engelskirchen et al.

It is certified that error appears in the above-indentified patent and that said Letters Patent is hereby corrected as shown below:

In col. 10, claim 29, line 12 through line 18, formula (I),

" 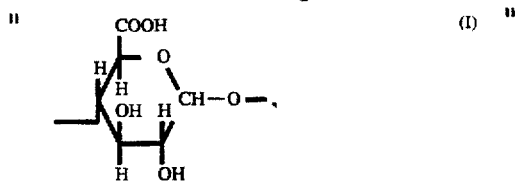 (I) "

should read,

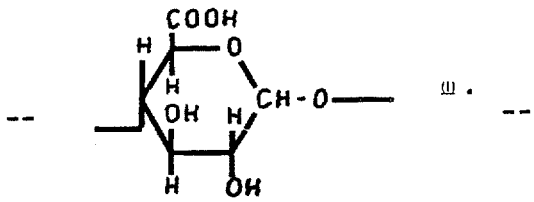

In col. 10, claim 34, line 45, "," should read --.--

Signed and Sealed this

Fifteenth Day of July, 1997

*Attest:*

BRUCE LEHMAN

*Attesting Officer*     *Commissioner of Patents and Trademarks*